US011485300B2

(12) United States Patent
Takakura et al.

(10) Patent No.: US 11,485,300 B2
(45) Date of Patent: Nov. 1, 2022

(54) WIRE HARNESS PROTECTOR AND ROUTING STRUCTURE OF WIRE HARNESS USING WIRE HARNESS PROTECTOR

(71) Applicants: AutoNetworks Technologies, Ltd., Mie (JP); SUMITOMO WIRING SYSTEMS, LTD., Mie (JP); SUMITOMO ELECTRIC INDUSTRIES, LTD., Osaka (JP)

(72) Inventors: Ryuta Takakura, Mie (JP); Shigeki Ikeda, Mie (JP); Tetsuya Nishimura, Mie (JP); Takayuki Suzuki, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 30 days.

(21) Appl. No.: 16/976,111

(22) PCT Filed: Dec. 21, 2018

(86) PCT No.: PCT/JP2018/047233
§ 371 (c)(1),
(2) Date: Aug. 27, 2020

(87) PCT Pub. No.: WO2019/176221
PCT Pub. Date: Sep. 19, 2019

(65) Prior Publication Data
US 2020/0406839 A1 Dec. 31, 2020

(30) Foreign Application Priority Data
Mar. 16, 2018 (JP) .............................. JP2018-048929

(51) Int. Cl.
*B60R 16/02* (2006.01)
*F16L 3/123* (2006.01)
(Continued)

(52) U.S. Cl.
CPC .......... *B60R 16/0215* (2013.01); *F16L 3/123* (2013.01); *F16L 57/00* (2013.01); *H02G 3/0437* (2013.01)

(58) Field of Classification Search
CPC .... B60R 16/0215; H01R 25/162; H02G 3/04; H02G 3/0406
(Continued)

(56) References Cited

U.S. PATENT DOCUMENTS 10,727,655 B2 * 7/2020 Fujimura ................. H02G 3/38
11,152,135 B2 * 10/2021 Nishimura ........... H01B 7/0846
(Continued)

FOREIGN PATENT DOCUMENTS

CN 103348547 10/2013
CN 104520150 A 4/2015
(Continued)

OTHER PUBLICATIONS

International Preliminary Report on Patentability (IPRP) issued in International Patent Application No. PCT/JP2018/047233, dated Feb. 4, 2020, together with an English translation thereof.
(Continued)

*Primary Examiner* — Krystal Robinson
(74) *Attorney, Agent, or Firm* — Greenblum & Bernstein, P.L.C.

(57) ABSTRACT

The wire harness protector includes: electrical wiring insertion parts in which electrical wirings constituting a wire harness are divided and housed, wherein electrical wiring insertion parts are arranged in parallel, at least one side of an arrangement direction of electrical wiring insertion parts is
(Continued)

a branch direction of the electrical wirings, at least one branch electrical wiring window is provided in each of the electrical wiring insertion parts except for one of the electrical wiring insertion parts located farthest from the branch direction to extending in a longitudinal direction and be opened in both side surfaces, into which branch electrical wirings made up of a part of the electrical wirings can be inserted, and the branch electrical wiring insertion window is provided in at least a side surface on a side of the branch direction of one of the electrical wiring insertion parts located farthest from the branch direction.

9 Claims, 8 Drawing Sheets

(51) Int. Cl.
  *F16L 57/00* (2006.01)
  *H02G 3/04* (2006.01)
(58) Field of Classification Search
  USPC .......................................................... 174/72 a
  See application file for complete search history.

(56) References Cited

U.S. PATENT DOCUMENTS

| | | |
|---|---|---|
| 2002/0098717 A1 | 7/2002 | Matsuda et al. |
| 2003/0005554 A1 | 1/2003 | Nagayasu |
| 2005/0106934 A1* | 5/2005 | Hatori ................ H01R 13/5833 439/501 |
| 2009/0260846 A1* | 10/2009 | Henry .................. H02G 3/0406 174/101 |
| 2012/0205134 A1* | 8/2012 | Brasier ................ H02G 3/0443 174/68.3 |
| 2013/0206928 A1* | 8/2013 | Murakoshi ............ F16L 3/1025 248/65 |
| 2013/0277107 A1 | 10/2013 | Hara |
| 2015/0000974 A1 | 1/2015 | Shiga et al. |

FOREIGN PATENT DOCUMENTS

| | | |
|---|---|---|
| CN | 104520150 B | 6/2017 |
| JP | 3-21143 Y2 | 5/1991 |
| JP | 6-70415 U | 9/1994 |
| JP | 2003-54330 | 2/2003 |
| JP | 2007-76576 | 3/2007 |
| JP | 2014-233159 | 12/2014 |
| JP | 2015-46991 | 3/2015 |
| JP | 6052105 | 12/2016 |

OTHER PUBLICATIONS

International Search Report issued in International Patent Application No. PCT/JP2018/047233, dated Mar. 19, 2019, together with an English translation thereof.
China Official Action, issued in China Patent Application No. 201880091221.0, dated Apr. 21, 2021, together with English translation thereof.

* cited by examiner

WIRE HARNESS PROTECTOR AND ROUTING STRUCTURE OF WIRE HARNESS USING WIRE HARNESS PROTECTOR

TECHNICAL FIELD

The present invention relates to a wire harness protector into which a large number of electrical wirings routed in an automobile, for example, are inserted for holding the electrical wirings and a wire harness routing structure using the same.

BACKGROUND ART

Conventionally, in an electrical component system of an automobile, for example, a large number of routed electrical wirings are inserted into and held in a wire harness protector to be fixed to a fixed object on a vehicle side, thus the electrical wiring is protected from an external interfering member and a route of the electrical wiring is regulated.

Such a wire harness protector includes a gutter-like protector body and a cover part covering an opening on an upper side of the protector body as described in Japanese Patent Application Laid-Open No. 6-70415 (Patent Document 1), for example. A large number of electrical wirings are inserted into the protector body, and subsequently, the cover is fixed to the protector body via a locking mechanism provided to protrude outward from a side wall of the protector, thus the large number of electrical wirings can be held and housed in the protector body.

PRIOR ART DOCUMENTS

Patent Documents

Patent Document 1: Japanese Patent Application Laid-Open No. 6-70415

SUMMARY

Problem to be Solved by the Invention

Recently, the number of electrical components tends to increase in addition to a demand for downsizing an automobile, so that a space for routing the wire harness is decreasing even though the number of electrical wirings constituting the wire harness increases. Thus, in the wire harness protector having the conventional structure described above, the size of the protector body for inserting and holding the wire harness inevitably increases, so that the wire harness protector cannot be disposed in a predetermined routing space in some cases.

Particularly, when there is a branch part where a branch line branches off from a main line of the wire harness, a part where the branch part is inserted and held needs to be additionally provided, so that the size of the protector inevitably increases.

The present invention is done on the background of the above circumstance, and a problem to be solved is to provide a wire harness protector having a novel structure capable of compactly inserting and holding a wire harness including a branch part while suppressing a protrusion height from a fixed object, and a routing structure of a wire harness using the same.

Means to Solve the Problem

The present invention relating to a wire harness protector includes: a plurality of electrical wiring insertion parts in which a plurality of electrical wirings constituting a wire harness are divided and housed, wherein the plurality of electrical wiring insertion parts are disposed in parallel with each other, at least one side of an arrangement direction of the plurality of electrical wiring insertion parts is a branch direction of the electrical wirings, at least one branch electrical wiring insertion window is provided in each of the electrical wiring insertion parts except for one of the electrical wiring insertion parts located farthest from the branch direction to extend in a longitudinal direction orthogonal to the arrangement direction and be opened in both side surfaces, into which a branch electrical wiring made up of a part of the electrical wirings can be inserted, in a middle part in the longitudinal direction, and the branch electrical wiring insertion window is provided in at least a side surface on a side of the branch direction of one of the electrical wiring insertion parts located farthest from the branch direction.

The present invention relating to a routing structure of a wire harness is a routing structure of a wire harness using a wire harness protector, wherein the wire harness protector according to any one of the first to third aspects is used as the wire harness protector, a plurality of electrical wirings constituting the wire harness are divided to be inserted into and held by the plurality of electrical wiring insertion parts, and the branch electrical wiring is inserted into the branch electrical wiring insertion window on the side of the branch direction to be laterally led out in one of the electrical wiring insertion parts located farthest in the branch direction, and the branch electrical wiring is inserted into the branch electrical wiring insertion window on the side of the branch direction and the branch electrical wiring insertion windows on the both side surfaces of one of the electrical wiring insertion parts disposed adjacent, on the side of the branch direction, to be laterally led out in another one of the electrical wiring insertion parts.

According to the present invention, the height of the wire harness protector can be reduced. The wire harness including the branch part can be compactly inserted and held. Furthermore, the reduction in the height of the wire harness protector including the branch part can be advantageously achieved.

DESCRIPTION OF EMBODIMENT(S)

Embodiments of the present invention are listed and described firstly.

A first aspect of the present invention relating to a wire harness protector includes a plurality of electrical wiring insertion parts in which a plurality of electrical wirings constituting a wire harness are divided and housed, wherein the plurality of electrical wiring insertion parts are disposed in parallel with each other, at least one side of an arrangement direction of the plurality of electrical wiring insertion parts is a branch direction of the electrical wirings, at least one branch electrical wiring insertion windows is provided in each of the electrical wiring insertion parts except for one of the electrical wiring insertion parts located farthest from the branch direction to extend in a longitudinal direction orthogonal to the arrangement direction and be opened in both side surfaces, into which a branch electrical wiring made up of a part of the electrical wirings can be inserted, in a middle part in the longitudinal direction, and the branch electrical wiring insertion window is provided in at least a side surface on a side of the branch direction of one of the electrical wiring insertion parts located farthest from the branch direction.

According to the present aspect, the plurality of electrical wiring insertion parts in which the plurality of electrical wirings are divided and housed are disposed in parallel with each other, thus even in a case where the number of the electrical wirings constituting the wire harness increases, the electrical wirings can be divided in the plurality of electrical wiring insertion parts, and housed and held therein, thus a height of the wire harness protector can be reduced. In addition, at least one side of an arrangement direction of the plurality of electrical wiring insertion parts is a branch direction of the electrical wirings, each of the electrical wiring insertion parts except for one of the electrical wiring insertion parts located farthest from the branch direction has branch electrical wiring insertion windows extending in a longitudinal direction and opened in both side surfaces in a middle part in the longitudinal direction, and one of the electrical wiring insertion parts located farthest from the branch direction has the branch electrical wiring insertion window in at least a side surface on a side of the branch direction. According to such a configuration, the branch electrical wiring can be inserted into the branch electrical wiring insertion window on the side of the branch direction to be laterally led out in one of the electrical wiring insertion parts located farthest in the branch direction. The branch electrical wiring can be inserted into the branch electrical wiring insertion window on the side of the branch direction and the branch electrical wiring insertion windows on the both side surfaces of one of the electrical wiring insertion parts disposed adjacent, on the side of the branch direction, to be laterally led out in the other one of the electrical wiring insertion parts. Accordingly, a stable holding of the branch electrical wiring can be achieved by inserting and holding the branch electrical wiring over the plurality of electrical wiring insertion parts without providing an additional part for inserting and holding a branch part in the wire harness protector, and the wire harness including the branch part can be compactly inserted and held.

Furthermore, the branch electrical wiring insertion window provided in each of the electrical wiring insertion parts is provided to extend in the longitudinal direction, thus the position where the electrical wirings branch off can be varied in the longitudinal direction for each of the electrical wiring insertion parts. Accordingly, it is possible to prevent increase in a height of electrical wiring bundle due to an overlap of the branch electrical wiring in the electrical wiring insertion part on a far side in the branch direction, and reduction in a height of the wire harness protector including the branch part can be advantageously achieved.

A second aspect of the present invention relating to the wire harness protector is the wire harness protector according to the first aspect, wherein each of the electrical wiring insertion parts has the branch electrical wiring insertion window in the both side surfaces, thus both sides of the plurality of electrical wiring insertion parts in the arrangement direction can be the branch direction of the electrical wirings.

According to the present aspect, each of the electrical wiring insertion parts includes the branch electrical wiring insertion windows on the both side surfaces so that both sides of the plurality of electrical wiring insertion parts in the arrangement direction are the branch direction. Accordingly, directionality of the wire harness protector is reduced, and general versatility can be improved.

A third aspect of the present invention relating to a wire harness protector is the wire harness protector according to the first or second aspect further including: a base member fixed to a fixed object; and a plurality of insertion part constituting members each including a longitudinal upper wall part disposed to face the base member with a gap therebetween and a pair of support leg parts protruding from both side edge parts on both sides of the upper wall part in a longitudinal direction toward the base member, wherein the pair of support leg parts of each of the insertion part constituting members are detachably fixed to a plurality of fixing parts provided on the base member, respectively, to constitute each of the electrical wiring insertion parts, and the branch electrical wiring insertion window is defined by the base member, the upper wall part, and the support leg parts on the both sides in the longitudinal direction in the side surface of each of the electrical wiring insertion parts.

According to the present aspect, the insertion part constituting members are detachably fixed to the base member fixed to the fixed object on a vehicle side to be able to constitute each of the electrical wiring insertion parts. The electrical wiring insertion part is made up in order of decreasing distance from the branch direction while routing the plurality of electrical wirings on the base member, thus improvement of workability and the simple and stable routing in the branch part can be achieved.

Furthermore, the insertion part constituting member is made up of the upper wall part and the pair of support leg parts protruding from the both sides of the upper wall part toward the base member, thus an upward protrusion of the electrical wirings inserted into and disposed in each of the electrical wiring insertion parts can be suppressed. Thus, the reduction in the height of the wire harness protector can be achieved more reliably.

A first aspect of the present invention relating to a routing structure of a wire harness is the routing structure of the wire harness using the wire harness protector, wherein the wire harness protector according to any one of the first to third aspects is used as the wire harness protector, a plurality of electrical wirings constituting the wire harness are divided to be inserted into and held by the plurality of electrical wiring insertion parts, and the branch electrical wiring is inserted into the branch electrical wiring insertion window on the side of the branch direction to be laterally led out in one of the electrical wiring insertion parts located farthest in the branch direction, and the branch electrical wiring is inserted into the branch electrical wiring insertion window on the side of the branch direction and the branch electrical wiring insertion windows on the both side surfaces of one of the electrical wiring insertion parts disposed adjacent, on the side of the branch direction, to be laterally led out in another one of the electrical wiring insertion parts.

According to the routing structure of the wire harness of the present aspect, the wire harness protector according to any one of the first to third aspects is used, and the plurality of electrical wiring insertion parts in which the plurality of electrical wirings are divided and housed are arranged in parallel with each other, thus even in a case where the number of electrical wirings constituting the wire harness increases, the electrical wirings can be divided in the plurality of electrical wiring insertion parts, and housed and held therein, thus a height of the wire harness protector can be reduced. In addition, at least one side of an arrangement direction of the plurality of electrical wiring insertion parts is a branch direction of the electrical wirings, each of the electrical wiring insertion parts except for one of the electrical wiring insertion parts located farthest from the branch direction has branch electrical wiring insertion windows extending in a longitudinal direction and opened in both side surfaces in a middle part in the longitudinal direction, and one of the electrical wiring insertion parts located farthest from the branch direction has the branch electrical wiring insertion window in at least a side surface on a side of the branch direction. According to such a configuration, the branch electrical wiring can be inserted into the branch electrical wiring insertion window on the side of the branch direction to be laterally led out in one of the electrical wiring insertion parts located farthest in the branch direction. The branch electrical wiring can be inserted into the branch electrical wiring insertion window on the side of the branch direction and the branch electrical wiring insertion windows on the both side surfaces of one of the electrical wiring insertion parts disposed adjacent, on the side of the branch direction, to be laterally led out in the other one of the electrical wiring insertion parts. Accordingly, a stable holding of the branch electrical wiring can be achieved by inserting and holding the branch electrical wiring over the plurality of electrical wiring insertion parts without providing an additional part for inserting and holding a branch part in the wire harness protector, and the wire harness including the branch part can be compactly inserted and held.

Furthermore, the branch electrical wiring insertion window provided in each of the electrical wiring insertion parts is provided to extend in the longitudinal direction, thus the position where the electrical wirings branch off can be varied in the longitudinal direction for each of the electrical wiring insertion parts. Accordingly, it is possible to prevent increase in a height of electrical wiring bundle due to an overlap of the branch electrical wiring in the electrical wiring insertion part on a distal side in the branch direction, and reduction in a height of the wire harness protector including the branch part can be advantageously achieved.

A second aspect of the present invention relating to a routing structure of a wire harness is the routing structure of the wire harness according to the first aspect, wherein a position where the branch electrical wiring is led out in each of the plurality of electrical wiring insertion parts is different from each other in the longitudinal direction.

According to the present aspect, the position where the branch electrical wiring is led out in each of the plurality of electrical wiring insertion parts is different from each other in the longitudinal direction. Accordingly, an overlap of the electrical wirings branching off from each electrical wiring insertion part is advantageously prevented, thus a height of the branching electrical wirings can be further reduced.

A third aspect of the present invention relating to a routing structure of a wire harness is the routing structure of the wire harness according to the first or second aspect, wherein a cross-sectional area of the wire harness divided and inserted into each of the electrical wiring insertion parts gradually decreases toward the branch direction.

According to the present aspect, the cross-sectional area of the wire harness inserted into each of the electrical wiring insertion parts gradually decreases toward the branch direction. That is to say, the thickness of the electrical wiring inserted into and disposed in each of the electrical wiring insertion parts is smallest in the electrical wiring insertion part located closest to the branch direction, and gradually increases toward the most distal electrical wiring insertion part. Accordingly, the branching electrical wiring does not get over the electrical wiring larger in thickness than the branching electrical wiring, thus a leveling of the cross-sectional area of the wire harness for inserting each electrical wiring insertion part can be achieved, and the reduction in height can be advantageously achieved.

Embodiments of the present invention are described with reference to the drawings hereinafter. In all of the drawings, the similar reference numerals will be assigned to the similar constituent elements, and the description is appropriately omitted.

FIGS. 1 to 4 illustrate a wire harness protector 10 as a first embodiment of the present invention. The wire harness protector 10 includes a base member 12, a plurality of (four in the present embodiment) insertion part constituting members 14. In the description hereinafter, an upper side indicates an upper side in FIGS. 1 to 4, a lower side indicates a lower side in FIGS. 1 to 4, a front side indicates a diagonally lower right in FIG. 1, a back side indicates a diagonally upper left, and a longitudinal direction indicates a front-back direction in FIG. 1.

Figure 2:
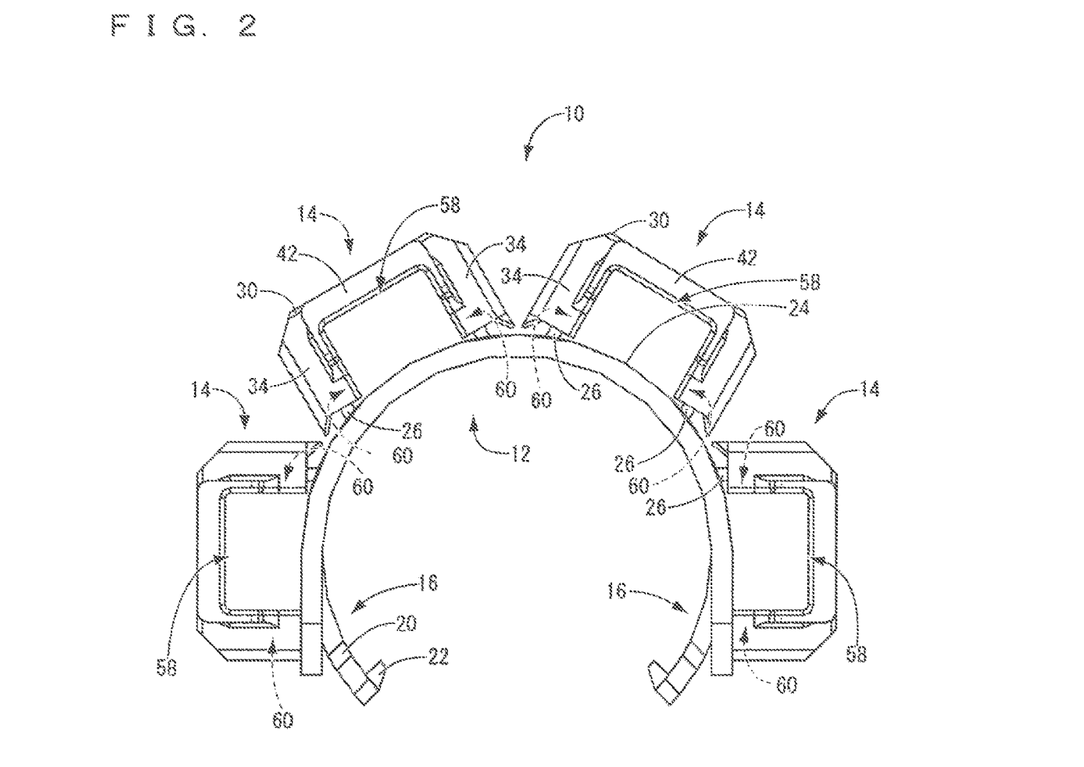
FIG. 2 A front view of FIG. 1.
Figure 3:
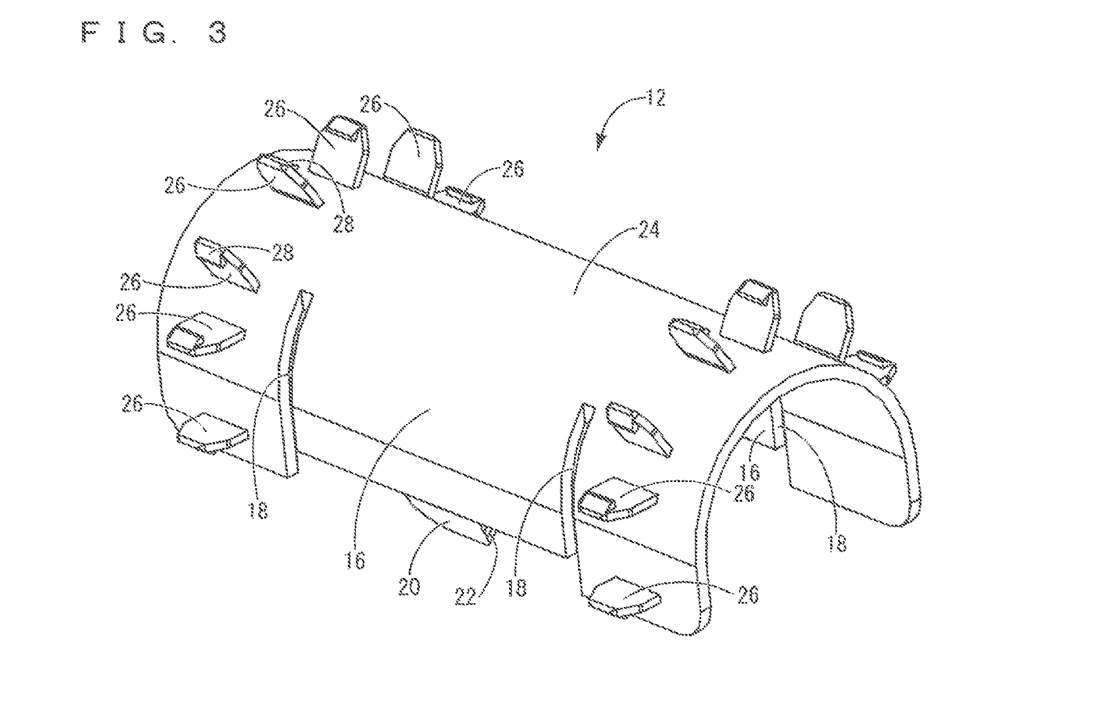
FIG. 3 A perspective view illustrating a base member in FIG. 1.

As illustrated in FIGS. 2 and 3, the base member 12 has a substantially gutter-like shape opened downward to have a substantially U-shaped cross section and extending in a longitudinal direction, and is integrally formed by an injection molding of a synthetic resin material such as polypropylene (PP) and polyamide (PA), for example. A fixing piece 16 is formed on both sides in a width direction (a right-left direction in FIG. 2) in a center part of the base member 12 in the longitudinal direction. Both sides of the fixing piece 16 in the longitudinal direction is separated from the base member 12 by a notch part 18, thus the fixing piece 16 has a cantilever shape extending downward with only a base end side connected to the base member 12. A locking part 20 with a substantially rectangular plate-like shape protruding diagonally downward and inward is provided in a center part of a protrusion end portion of the fixing piece 16 in the longitudinal direction, and a locking protrusion 22 protruding inward and extending to have a substantially trapezoidal cross section over a substantially entire length in the longitudinal direction is formed in a protrusion tip end portion of the locking part 20. In addition, plural pairs (four pairs in the present embodiment) of fixing parts 26 and 26 are provided on both end portions of an outer peripheral surface 24 of the base member 12 in the longitudinal direction to be separated from each other in a circumferential direction of the outer peripheral surface 24 and protrude outward to stand upright on the outer peripheral surface 24. The fixing parts 26 and 26 are formed to be separated from each other in the circumferential direction of the outer peripheral surface 24 and has a substantially rectangular plate-like shape, and a locking protrusion 28 protruding outward and extending in the longitudinal direction to have a substantially triangular cross section is provided on a surface of the protrusion end portion on a side not facing each other. A protrusion end surface of the locking protrusion 28 has a tapered surface close to the fixing part 26 with increasing distance from the outer peripheral surface 24.

Figure 4:
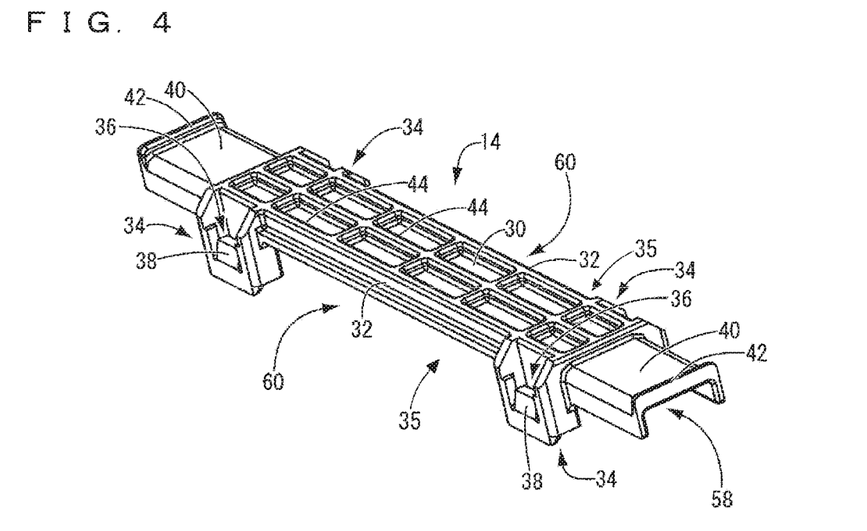
FIG. 4 A perspective view illustrating one insertion part constituting member in FIG. 1.

In the meanwhile, as illustrated in FIG. 4, the insertion part constituting member 14 has a substantially gutter-like shape opened downward to have a substantially U-shaped cross section and extending in the longitudinal direction, and is integrally formed by an injection molding of a synthetic resin material such as polypropylene (PP) and polyamide (PA), for example. The insertion part constituting member 14 includes an upper wall part 30 extending in the longitudinal direction to have a band-like shape, a sidewall part 32 extending downward from both side edge parts of the upper wall part 30 in the width direction over a substantially entire length in the longitudinal direction, and a pair of support leg parts 34 and 34 each protruding downward from both side edge parts on both sides of the upper wall part 30 in the longitudinal direction. The support leg part 34 has a substantially frame-like shape in which a base end portion is connected to the sidewall part 32, and a locking protrusion 38 with a substantially rectangular plate-like shape protruding diagonally upward and inward is provided on an upper side end edge part of a locking hole 36 opened in an up-down direction. The insertion part constituting member 14 includes a band fixing part 40 further extending outward from both side parts of the upper wall part 30, on which the pair of support leg parts 34 and 34 are provided, in the longitudinal direction, and a band member retaining protrusion 42 is formed to protrude from an extension end portion of the band fixing part 40 over a substantially entire length in the width direction. Furthermore, formed in the upper wall part 30 having a large thickness between portions where the support leg part 34 is provided is a thinned hole 44 having a substantially rectangular shape in a plan view and opened upward, thus intensity in the portion where the support leg part 34 is provided is increased and the synthetic resin material is advantageously saved.

Figure 5:
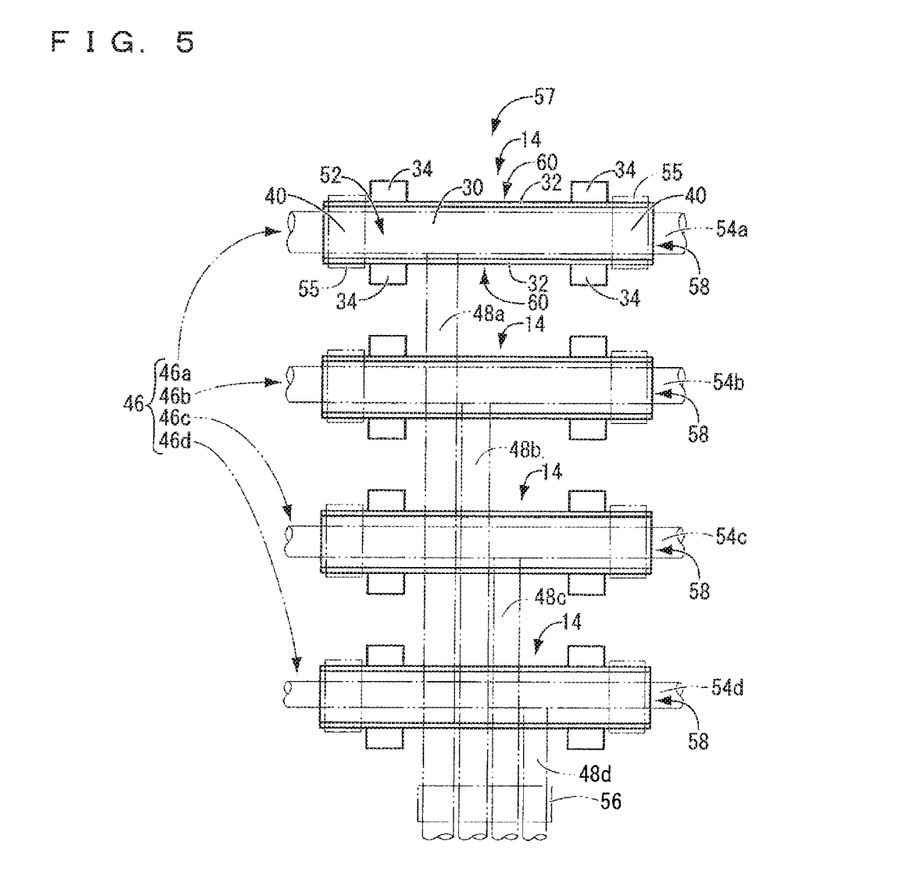
FIG. 5 A plan view illustrating a plurality of insertion part constituting members housing an electrical wiring and provided with a branch electrical wiring before a routing structure of a wire harness is attached to the base member.
Figure 6:
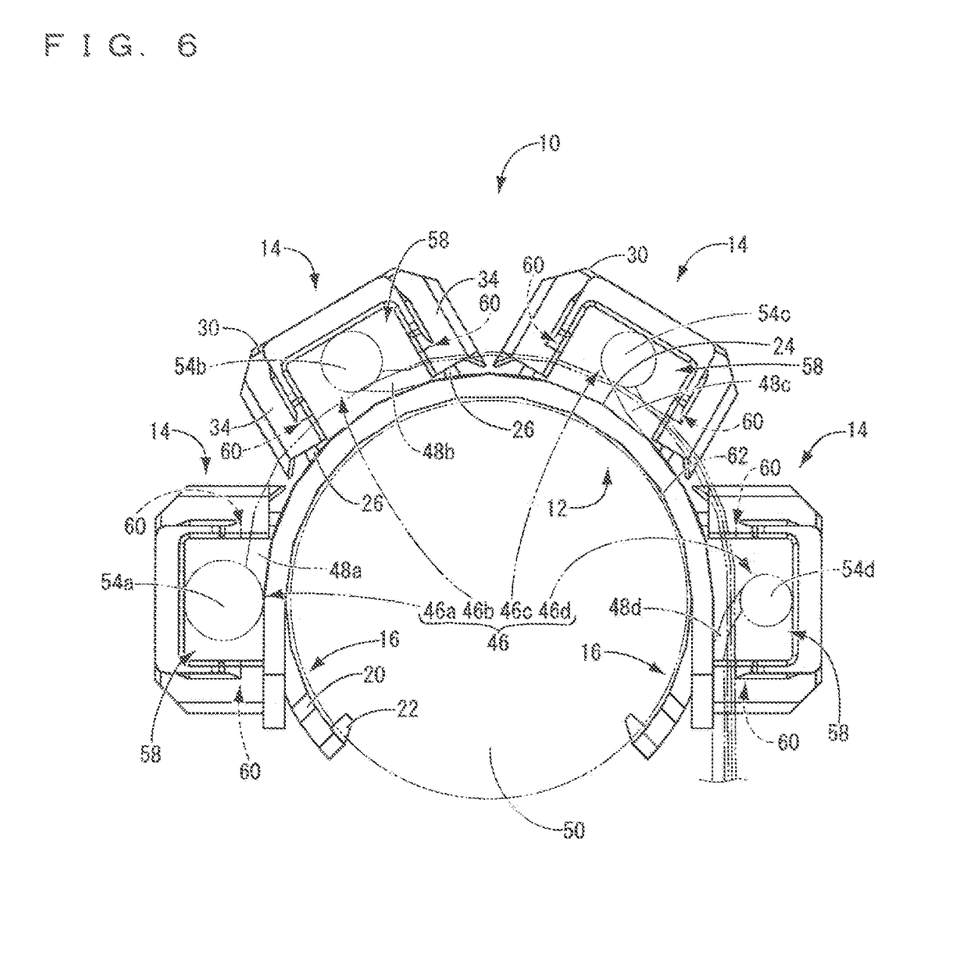
FIG. 6 A front view illustrating a routing structure of a wire harness using the wire harness protector of the present embodiment, and corresponding to FIG. 2.

Next, described using FIGS. 5 and 6 is a routing structure of a wire harness 46 using the wire harness protector 10 of the present embodiment in which the base member 12 and the insertion part constituting member 14 having such a configuration is included. In the present embodiment, the wire harness 46 includes wire harnesses 46a to 46d made up of divided plural electrical wirings. Each end portion of the wire harnesses 46a to 46d are connected to various electronic apparatuses via a connector, for example. In FIGS. 5 and 6, the wire harnesses 46a to 46d, branch electrical wirings 48a to 48d branching off from the wire harnesses 46a to 46d, a reinforcement 50 which is a fixed object, and band tapes 55 and 56 are illustrated by virtual lines for easy understanding.

Firstly, as illustrated in FIG. 5, the plurality of (four in the present embodiment) insertion part constituting members 14 are disposed on an operation table, for example, with the upper wall part 30 located on a lower side so that a lateral direction is directed to a longitudinal direction and a vertical direction is directed to an arrangement direction. Then, main lines 54a to 54d of the wire harnesses 46a to 46d constituting the wire harness 46 are disposed on a gutter part 52 surrounded by the upper wall part 30 of the plurality of insertion part constituting members 14 and the pair of sidewall parts 32 and 32 from above and housed therein, respectively. At this time, the branch electrical wirings 48a to 48d of the wire harnesses 46a to 46d are disposed to extend toward a front side which is one side of the arrangement direction. Subsequently, the main lines 54a to 54d of the wire harnesses 46a to 46d are positioned and held on the band fixing part 40 of the plurality of insertion part constituting members 14, respectively, using the band tape 55, for example, and extension end portions of the branch electrical wirings 48a to 48d are banded and fixed using the band tape 56, for example. As a result, completed is an intermediate member 57 in which the plurality of insertion part constituting members 14 of the present embodiment are attached to the wire harness 46. Accordingly, the main lines 54a to 54d of the wire harnesses 46a to 46d can be easily positioned and held on the both end portions of electrical wiring insertion parts 58 in the longitudinal direction, and the band fixing part 40 is not formed in a center part of the electrical wiring insertion part 58 in the longitudinal direction, thus a branch electrical wiring insertion window 60 can be automatically provided. Adoptable as the band member is an optional band member such as a banding band as well as the band tapes 55 and 56.

Next, the intermediate member 57 are turned over to locate the upper wall part 30 on an upper side, and subsequently the plurality of insertion part constituting members 14 constituting the intermediate member 57 are attached to the base member 12, thus the routing structure of the wire harness 46 using the wire harness protector 10 according to the present embodiment is completed. More specifically, the pair of fixing parts 26 and 26 provided on the base member 12 are inserted into the corresponding locking holes 36 provided in the pair of support leg parts 34 and 34 of each of the insertion part constituting members 14. Accordingly, the locking protrusion 28 of the fixing part 26 elastically deforms the locking protrusion 38 provided on the upper side end edge part of the locking hole 36 outward, thus the further insertion is allowed. After the insertion, the locking protrusion 38 of the support leg part 34 is elastically recovered, thus the fixing part 26 of the base member 12 is locked to the locking hole 36 of the support leg part 34, and the insertion part constituting member 14 is fixed to the base member 12. The above fixation can be released using a tool such as a driver, for example, thus is detachable. The fixation of the insertion part constituting member 14 and the base member 12 is not limited to the locking structure described above, but an optional known locking structure of locking a boss and a fitting hole, for example, can be adopted. It is also possible that the plurality of fixing parts on a side of the base material are provided at an optional pitch, and a required number of insertion part constituting members are provided in optional positions according to needs such as an amount of electrical wirings, for example, to improve general versatility of the wire harness protector.

Figure 1:
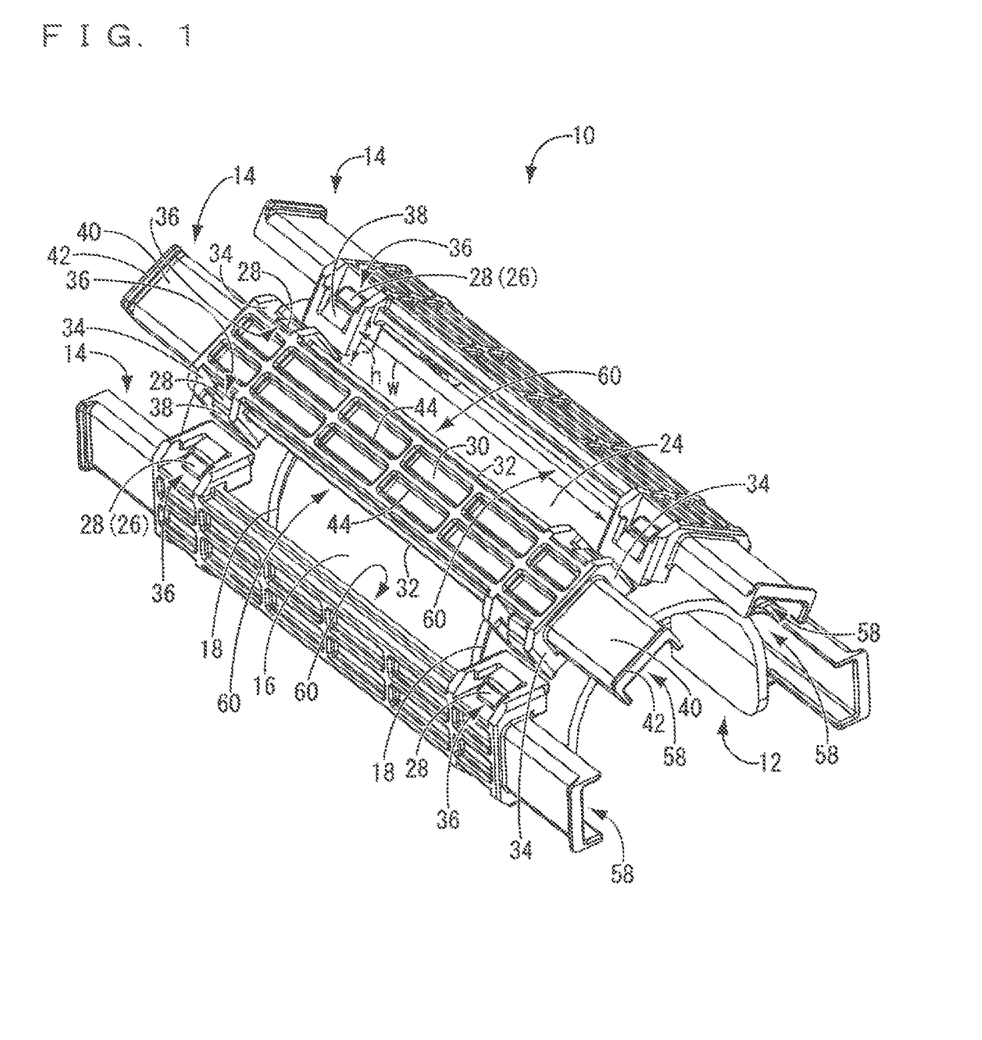
FIG. 1 A perspective view illustrating a wire harness protector as a first embodiment of the present invention.

As a result, as illustrated in FIG. 6, the upper wall part 30 of the insertion part constituting member 14 is disposed to face the outer peripheral surface 24 of the base member 12 with a gap therebetween, and the pair of support leg parts 34 and 34 protrude from the upper wall part 30 toward the base member 12. The electrical wiring insertion part 58 is made up of a region surrounded by the upper wall part 30, the pair of support leg parts 34 and 34, and the outer peripheral surface 24 of the base member 12. As illustrated in FIG. 1, for example, the branch electrical wiring insertion window 60 is defined by the base member 12, the upper wall part 30, and the pair of support leg parts 34 and 34 in the longitudinal direction in the side surface 35 of each of the electrical wiring insertion parts 58. That is to say, the branch electrical wiring insertion windows 60 are provided in each of the electrical wiring insertion parts 58 to extend in the longitudinal direction orthogonal to the arrangement direction and be opened in the both side surfaces 35, into which the branch electrical wirings 48a to 48d made up of a part of the electrical wirings constituting the wire harness 46 can be inserted, in the middle part in the longitudinal direction (refer to FIGS. 4 to 6). Accordingly, each of the electrical wiring insertion parts 58 has the branch electrical wiring insertion windows 60 in the both side surfaces 35, and the both sides of the plurality of electrical wiring insertion parts 58 in the arrangement direction can be the branch direction of the branch electrical wirings 48a to 48d. Herein, in the present embodiment, as a relationship between a height dimension: h and a width dimension (in the longitudinal direction): w of the branch electrical wiring insertion window 60 (refer to FIG. 1), the width dimension: w is preferably larger than the height dimension: h (w>h). It is more preferable that the width dimension: w is equal to or more than twice the height dimension: h, and it is still more preferable that the width dimension: w is equal to or more than triple the height dimension: h. In the present embodiment, the width dimension: w of the branch electrical wiring insertion window 60 is approximately five times as large as the height dimension: h.

As illustrated in FIG. 6, the electrical wiring insertion part 58 is made up of a region surrounded by the upper wall part 30, the pair of support leg parts 34 and 34, and the outer peripheral surface 24 of the base member 12, and the wire harnesses 46a to 46d made up of the divided plural electrical wirings constituting the wire harness 46 are inserted into and held by the plurality of electrical wiring insertion parts 58 arranged in parallel with each other. Thus, an upward protrusion of the wire harnesses 46a to 46d inserted into and disposed in each of the electrical wiring insertion parts 58 can be suppressed, and the reduction in the height of the wire harness protector can be achieved more reliably. One side of the arrangement direction of the plurality of electrical wiring insertion parts 58 (a right side in a clockwise manner in FIG. 6) is the branch direction of the branch electrical wirings 48a to 48d, and in the electrical wiring insertion part 58 located farthest in the branch direction (where the wire harness 46a is inserted and held), the branch electrical wiring 48a is inserted into the branch electrical wiring insertion window 60 on the side of the branch direction (the right side in the clockwise manner in FIG. 6) and laterally led out. In the meanwhile, in the other electrical wiring insertion part 58, the branch electrical wirings 48d to 48a are inserted into the branch electrical wiring insertion window 60 on the side of the branch direction and the branch electrical wiring insertion windows 60 on the both side surfaces 35 of the electrical wiring insertion part 58 disposed adjacent, on the side of the branch direction, and are laterally led out.

Furthermore, as illustrated in FIG. 5, the position where the branch electrical wirings 48a to 48d are led out in the plurality of electrical wiring insertion parts 58 is different from each other in the longitudinal direction (the right-left direction in FIG. 5). Accordingly, an overlap of the branch electrical wirings 48a to 48d branching off from each electrical wiring insertion part 58 is advantageously prevented, thus the height of the branch electrical wirings 48a to 48d can be further reduced. In addition, cross-sectional areas Sa to Sd of the wire harnesses 46a to 46d constituting the wire harness 46 inserted into the electrical wiring insertion parts 58 gradually decreases toward the branch direction (a right side in the clockwise manner in FIG. 6) (refer to FIG. 6, Sa>Sb>Sc>Sd). That is to say, the main lines 54a to 54d of the wire harnesses 46a to 46d which need to get over the greater number of branch electrical wirings 48a to 48c have the smaller areas, thus a leveling of the cross-sectional areas of the main lines 54a to 54d of the wire harnesses 46a to 46d and the branch electrical wirings 48a to 48c can be achieved, and the reduction in height can be advantageously achieved.

Finally, as illustrated in FIG. 6, the wire harness protector 10 of the present embodiment in which the wire harness 46 is routed as described above is fixed to the reinforcement 50 which is a fixed object. More specifically, the base member 12 is disposed on an outer peripheral surface 62 of the tubular reinforcement 50 extending in the longitudinal direction from above so that the longitudinal direction of the base member 12 follows the longitudinal direction of the reinforcement 50, and then the base member 12 is pressed against the reinforcement 50. Accordingly, the pair of fixing pieces 16 and 16 of the base member 12 are elastically deformed in a direction away from each other and the further insertion is allowed, and the locking protrusion 22 of each of the pair of fixing pieces 16 and 16 is fitted into an attaching hole provided in the outer peripheral surface 62 of the reinforcement 50 but not shown, thereby being elastically recovered. As a result, the wire harness protector 10 of the present embodiment can be stably held on the reinforcement 50. In this manner, the shape of the base member 12 is fit with the shape of the fixed object even when the fixed object is not flat, such as the reinforcement 50, thus the wire harness protector 10 can be easily attached thereto. In the above example, the tubular reinforcement 50 is described as the fixed object, however, the fixed object may be vehicle body frame, thus the shape is not limited to a tubular shape but an optional shape is obviously adoptable.

According to the routing structure of the wire harness 46 using the wire harness protector 10 of the present embodiment having such a configuration, the wire harness 46 includes the wire harnesses 46a to 46d made up of the divided plural electrical wirings, and the plurality of electrical wiring insertion parts 58 in which the wire harnesses 46a to 46d are housed are arranged in parallel with each other. Accordingly, even when the number of electrical wirings constituting the wire harness 46 increases, the reduction in the height of the wire harness protector 10 can be advantageously maintained.

Figure 7:
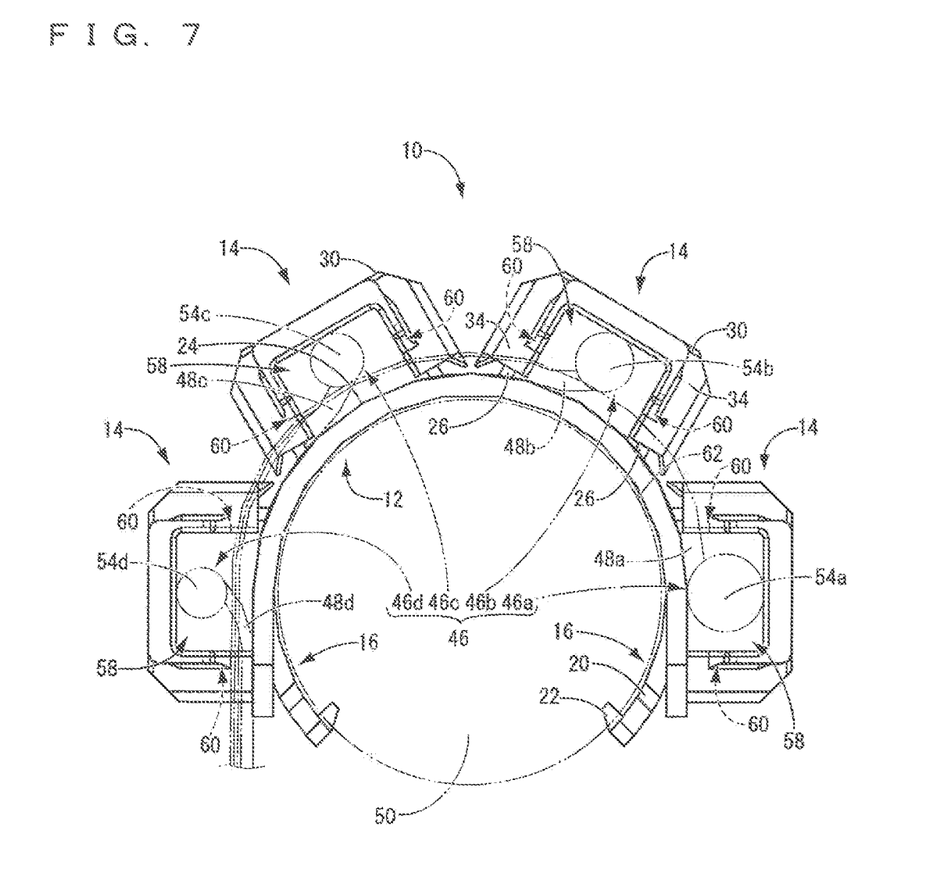
FIG. 7 A front view illustrating a routing structure of a wire harness using the wire harness protector of the present embodiment, and having a branch direction opposite to that in FIG. 6.
Figure 8:
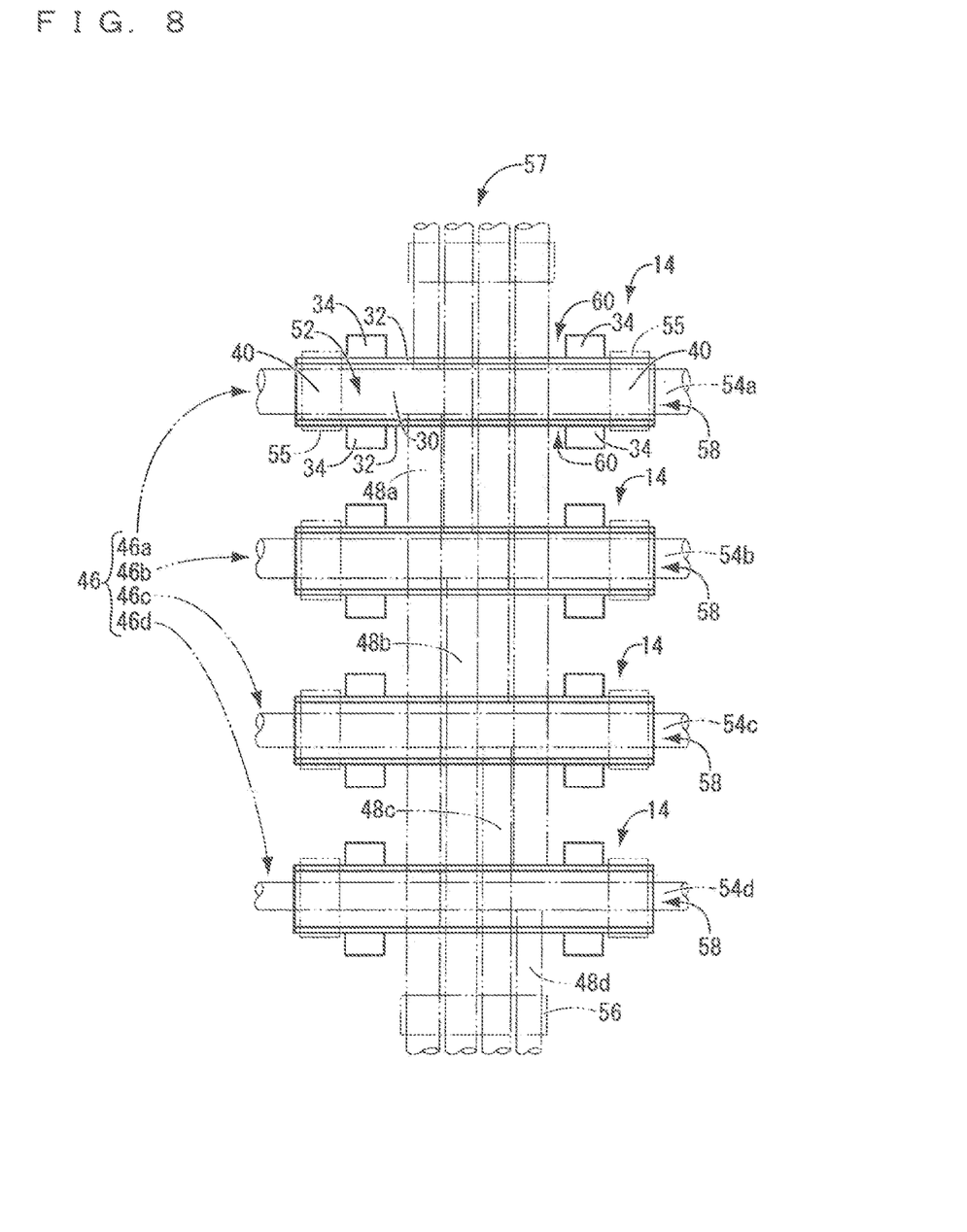
FIG. 8 A plan view illustrating a routing structure of the wire harness before attached to the base member in a case where a branch direction is directed to both directions, and corresponding to FIG. 5.
Figure 9:
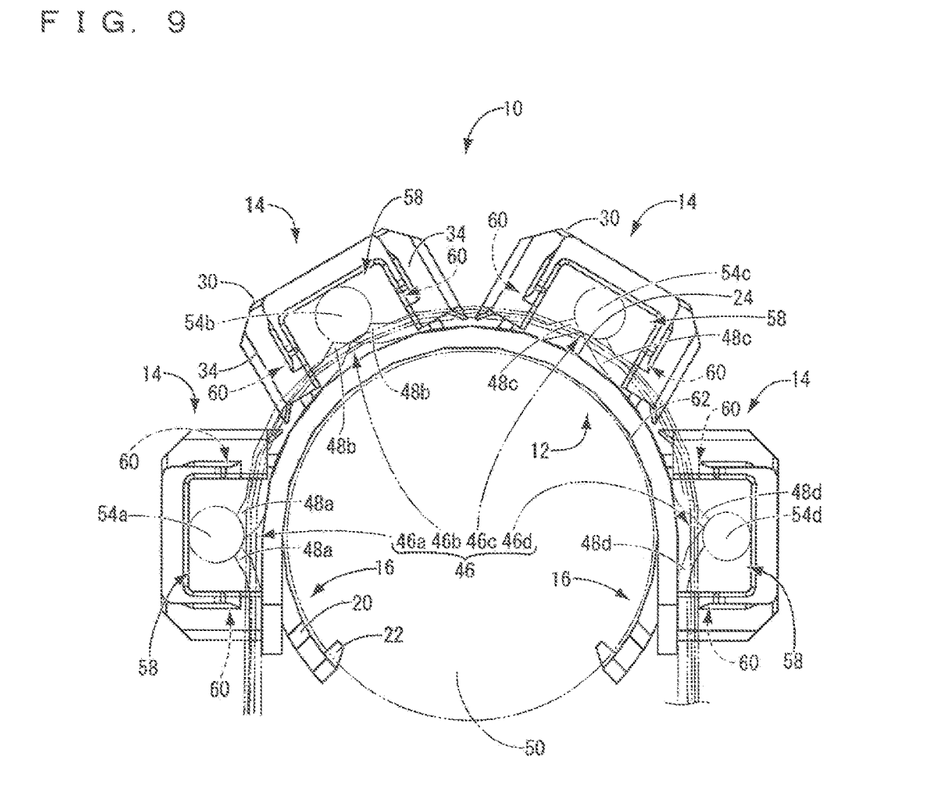
FIG. 9 A front view illustrating a routing structure of a wire harness in a case where the branch direction illustrated in FIG. 8 is directed to both directions, and corresponding to FIG. 6.

The embodiments of the present invention are described above in detailed, however, the present invention is not limited to these specific descriptions. For example, in the routing structure of the wire harness 46 using the wire harness protector 10 of the present embodiment, the branch direction of the branch electrical wirings 48a to 48d of the wire harnesses 46a to 46d made up of the divided plural electrical wirings constituting the wire harness 46 is one side of the arrangement direction of the plurality of electrical wiring insertion parts 58 (the right side in the clockwise manner in FIG. 6). However, as the other routing structure of the wire harness 46 using the wire harness protector 10 of the present embodiment illustrated in FIG. 7, the branch direction of the branch electrical wirings 48a to 48d may be the other side of the arrangement direction of the plurality of electrical wiring insertion parts 58 (a left side in an anticlockwise manner in FIG. 7). Alternatively, as the other routing structure of the wire harness 46 using the wire harness protector 10 of the present embodiment illustrated in FIGS. 8 and 9, the branch direction of the branch electrical wirings 48a to 48d may be the both sides of the arrangement direction of the plurality of electrical wiring insertion parts 58 (the right side in the clockwise manner and the left side in the anticlockwise manner in FIG. 9). In this manner, according to the wire harness protector 10 of the present embodiment, each of the electrical wiring insertion parts 58 includes the branch electrical wiring insertion windows 60 on the both side surfaces so that the both sides of the plurality of electrical wiring insertion parts 58 in the arrangement direction are the branch direction, thus directionality of the wire harness protector 10 is reduced, and general versatility can be improved.

Figure 10:
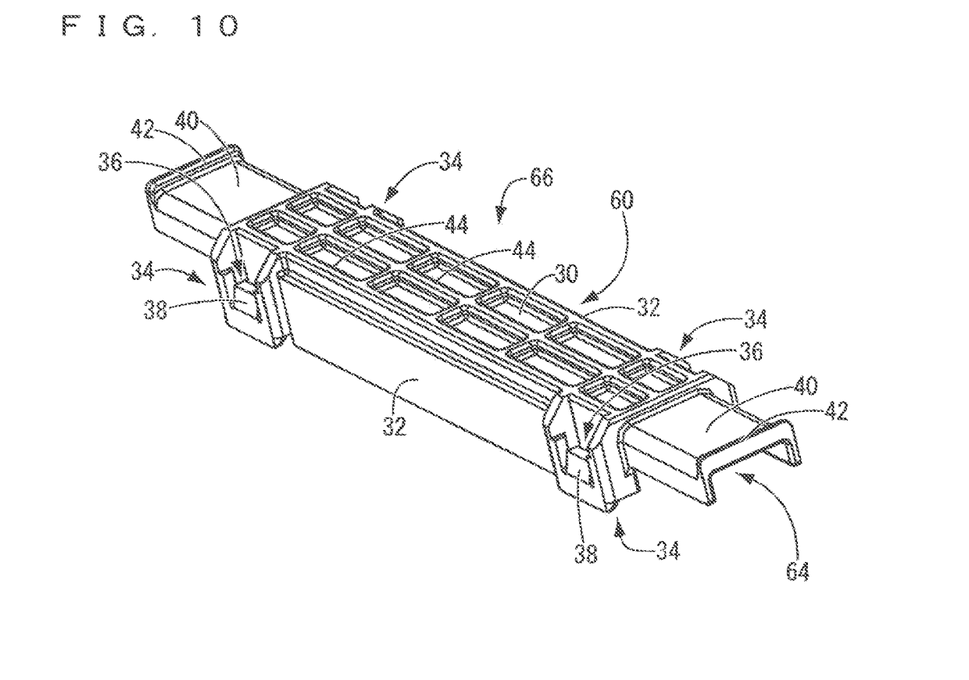
FIG. 10 A perspective view illustrating an insertion part constituting member having a structure different from that in FIG. 4.
Figure 11:
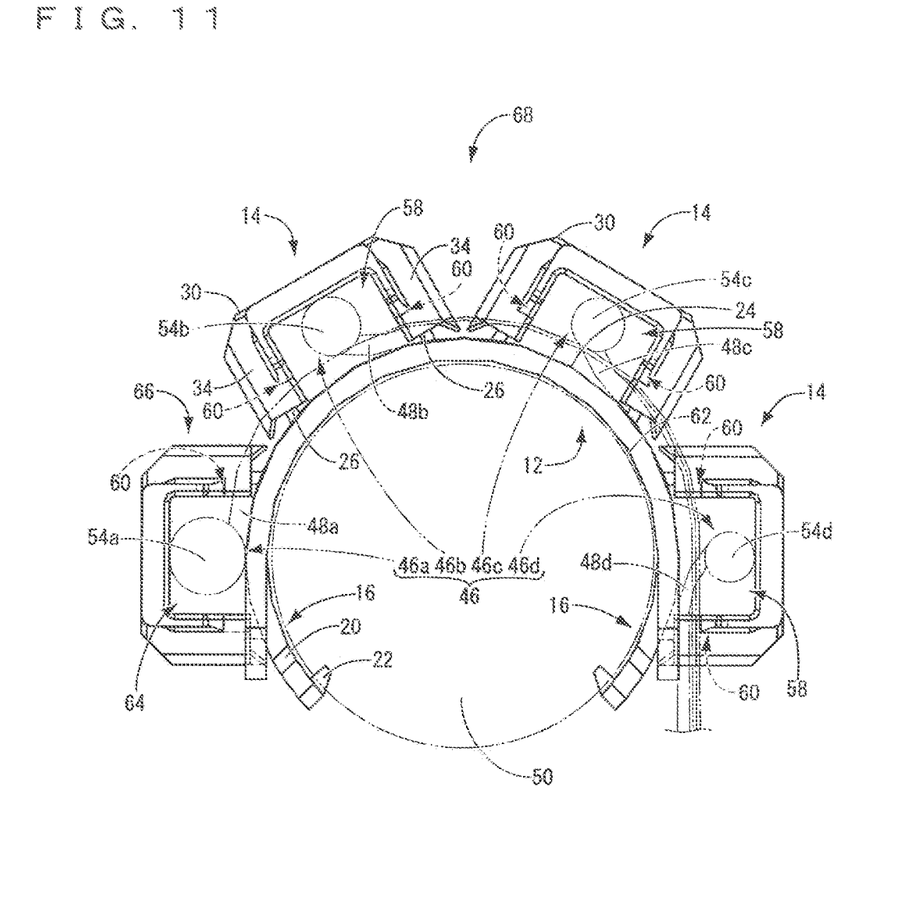
FIG. 11 A front view illustrating a routing structure of a wire harness using the wire harness protector having the insertion part constituting member illustrated in FIG. 10, and corresponding to FIG. 6.

In the wire harness protector 10 of the present embodiment, each of the electrical wiring insertion parts 58 includes the branch electrical wiring insertion windows 60 on the both side surfaces, however, as the wire harness protector 68 according to the second embodiment of the present invention illustrated in FIGS. 10 and 11, it is sufficient that the branch electrical wiring insertion window 60 is provided in at least the side surface on the side of the branch direction (a clockwise right direction in FIG. 11) of the insertion part constituting member 66 constituting the electrical wiring insertion part 64 located farthest from the branch direction (a clockwise right direction in FIG. 11). That is to say, as illustrated in FIG. 11, the branch electrical wiring insertion window 60 needs not be provided in the side surface opposite to the side of the branch direction (the right side in the clock wise manner in FIG. 11). Furthermore, when the branch electrical wiring is led out from the center part in the arrangement direction to the both side, each electrical wiring insertion parts 58 located on the both sides of the center part is the electrical wiring insertion part 58 located farthest from the branch direction, thus the branch electrical wiring insertion window 60 may be provided only on the side surface on the side of the branch direction thereof.

In addition, in the above embodiments, the electrical wiring insertion part 58 is made up of the region surrounded by the upper wall part 30, the pair of support leg parts 34 and 34, and the outer peripheral surface 24 of the base member 12, however, the electrical wiring insertion part may be made up of an upper wall part and a pair of support leg parts and opened upward. Accordingly, the wire harness 46 can be assembled from above after constituting the wire harness protector.

In the above embodiments, the wire harness protector 10 includes the base member 12, but needs not include the base member 12. For example, it is also applicable that each of the plurality of electrical wiring insertion parts 58 are made up of a tubular body in which the branch electrical wiring insertion window 60 is opened and formed in the side surface, and the electrical wiring insertion parts 58 are connected in the arrangement direction by an optional connection member to constitute the wire harness protector.

EXPLANATION OF REFERENCE SIGNS

10, 68: wire harness protector, 12: base member, 14, 66: insertion part constituting member, 26: fixing part, 30: upper wall part, 34: support leg part, 46: wire harness, 46a to 46d: wire harness, 48a to 48d: branch electrical wiring, 50: reinforcement (fixed object), 58, 64: electrical wiring insertion part, 60: branch electrical wiring insertion window

The invention claimed is:

1. A wire harness protector, comprising
a plurality of electrical wiring insertion parts in which a plurality of electrical wirings constituting a wire harness are divided and housed, wherein
the plurality of electrical wiring insertion parts are arranged in parallel with each other,
at least one side of an arrangement direction of the plurality of electrical wiring insertion parts is a branch direction of the electrical wirings,
at least one branch electrical wiring insertion window is provided on both side surfaces of each of the electrical wiring insertion parts except for one of the electrical wiring insertion parts located farthest from the branch direction, the at least one branch electrical wiring insertion window extending in a longitudinal direction orthogonal to the arrangement direction and being provided in a middle part of each of the electrical wiring insertion parts in the longitudinal direction, a branch electrical wiring made up of a part of the electrical wirings being insertable into the at least one branch electrical wiring insertion window, and
the branch electrical wiring insertion window is provided in at least a side surface on a side of the branch direction of the one of the electrical wiring insertion parts located farthest from the branch direction,
the wire harness protector further comprising:
a base member fixed to a fixed object; and
a plurality of insertion part constituting members each including a longitudinal upper wall part disposed to face the base member with a gap therebetween and a pair of support leg parts protruding from both side edge parts on both sides of the upper wall part in the longitudinal direction toward the base member, wherein
the plurality of insertion part constituting members are separately and individually attached to the base member to constitute the plurality of electrical wiring insertion parts.

2. The wire harness protector according to claim 1, wherein
each of the electrical wiring insertion parts has the branch electrical wiring insertion windows in the both side surfaces, thus both sides of the plurality of electrical wiring insertion parts in the arrangement direction can be the branch direction of the electrical wirings.

3. The wire harness protector according to claim 1, wherein
the pair of support leg parts of each of the insertion part constituting members are detachably fixed to a plurality of fixing parts provided on the base member, respectively, to constitute each of the electrical wiring insertion parts, and the branch electrical wiring insertion window is defined by the base member, the upper wall part, and the support leg parts on the both sides in the longitudinal direction in the side surface of each of the electrical wiring insertion parts.

4. A routing structure of a wire harness using a wire harness protector, wherein the wire harness protector according to claim 1 is used as the wire harness protector, the plurality of electrical wirings constituting the wire harness are divided to be inserted into and held by the plurality of electrical wiring insertion parts, and the branch electrical wiring is inserted into the branch electrical wiring insertion window on the side of the branch direction to be laterally led out in one of the electrical wiring insertion parts located farthest in the branch direction, and the branch electrical wiring is inserted into the branch electrical wiring insertion window on the side of the branch direction and the branch electrical wiring insertion windows on the both side surfaces of one of the electrical wiring insertion parts disposed adjacent, on the side of the branch direction, to be laterally led out in another one of the electrical wiring insertion parts.

5. The routing structure of the wire harness according to claim 4, wherein
a position where the branch electrical wiring is led out in each of the plurality of electrical wiring insertion parts is different from each other in the longitudinal direction.

6. The routing structure of the wire harness according to claim 4, wherein
a cross-sectional area of the wire harness divided and inserted into each of the electrical wiring insertion parts gradually decreases toward the branch direction.

7. A wire harness protector, comprising
a plurality of electrical wiring insertion parts in which a plurality of electrical wirings constituting a wire harness are divided and housed, wherein
the plurality of electrical wiring insertion parts are arranged in parallel with each other,
at least one side of an arrangement direction of the plurality of electrical wiring insertion parts is a branch direction of the electrical wirings,
at least one branch electrical wiring insertion window is provided on both side surfaces of each of the electrical wiring insertion parts except for one of the electrical wiring insertion parts located farthest from the branch direction, the at least one branch electrical wiring insertion window extending in a longitudinal direction orthogonal to the arrangement direction and being provided in a middle part of each of the electrical wiring insertion parts in the longitudinal direction, a branch electrical wiring made up of a part of the electrical wirings being insertable into the at least one branch electrical wiring insertion window, and
the branch electrical wiring insertion window is provided in at least a side surface on a side of the branch direction of the one of the electrical wiring insertion parts located farthest from the branch direction, the wire harness protector further comprising:
a base member fixed to a fixed object; and
a plurality of insertion part constituting members each including a longitudinal upper wall part disposed to face the base member with a gap therebetween and a pair of support leg parts protruding from both side edge parts on both sides of the upper wall part in a longitudinal direction toward the base member, wherein
the pair of support leg parts are fixed to the base member, and the branch electrical wiring insertion window is defined by the base member, the upper wall part, and the support leg parts on the both sides in the longitudinal direction.

8. The wire harness protector according to claim 1, wherein
the plurality of electrical wiring insertion parts are arranged to be separated from and in parallel with each other.

9. A wire harness protector, comprising
a plurality of electrical wiring insertion parts in which a plurality of electrical wirings constituting a wire harness are divided and housed, wherein
the plurality of electrical wiring insertion parts are arranged in parallel with each other,
at least one side of an arrangement direction of the plurality of electrical wiring insertion parts is a branch direction of the electrical wirings,
at least one branch electrical wiring insertion window is provided on both side surfaces of each of the electrical wiring insertion parts except for one of the electrical wiring insertion parts located farthest from the branch direction, the at least one branch electrical wiring insertion window extending in a longitudinal direction orthogonal to the arrangement direction and being provided in a middle part of each of the electrical wiring insertion parts in the longitudinal direction, a branch electrical wiring made up of a part of the electrical wirings being insertable into the at least one branch electrical wiring insertion window, and
the branch electrical wiring insertion window is provided in at least a side surface on a side of the branch direction of one of the electrical wiring insertion parts located farthest from the branch direction,
the wire harness protector further comprising:
a base member fixed to a fixed object; and
a plurality of insertion part constituting members each including a longitudinal upper wall part disposed to face the base member with a gap therebetween and a pair of support leg parts protruding from both side edge parts on both sides of the upper wall part in the longitudinal direction toward the base member, wherein
the pair of support leg parts of each of the insertion part constituting members are detachably fixed to a plurality of fixing parts provided on the base member, respectively, to constitute each of the electrical wiring insertion parts, and the branch electrical wiring insertion window is defined by the base member, the upper wall part, and the support leg parts on the both sides in the longitudinal direction in the side surface of each of the electrical wiring insertion parts.

* * * * *